(12) United States Patent
Carroll et al.

(10) Patent No.: US 7,069,205 B1
(45) Date of Patent: Jun. 27, 2006

(54) SYSTEM AND METHOD FOR EMULATING THE OPERATION OF A VIDEO GRAPHICS ADAPTER

(75) Inventors: Tim Carroll, Redwood City, CA (US); Aaron Giles, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 09/617,624

(22) Filed: Jul. 17, 2000

(51) Int. Cl.
G06G 9/455 (2006.01)

(52) U.S. Cl. .......................................... 703/24; 703/23
(58) Field of Classification Search ................. 703/24, 703/23
See application file for complete search history.

(56) References Cited

U.S. PATENT DOCUMENTS

| | | | |
|---|---|---|---|
| 4,779,188 A | 10/1988 | Gum et al. | 364/200 |
| 4,875,186 A | 10/1989 | Blume, Jr. | 703/24 |
| 4,903,218 A * | 2/1990 | Longo et al. | 715/759 |
| 4,958,378 A * | 9/1990 | Bell | 382/222 |
| 4,979,738 A * | 12/1990 | Frederiksen | 345/698 |
| 5,063,499 A | 11/1991 | Garber | 395/500 |
| 5,269,021 A * | 12/1993 | Denio et al. | 719/323 |
| 5,278,973 A | 1/1994 | O'Brien et al. | 395/500 |
| 5,301,277 A | 4/1994 | Kanai | 709/301 |
| 5,367,628 A | 11/1994 | Ote et al. | 345/501 |
| 5,406,644 A | 4/1995 | MacGregor | 703/23 |
| 5,448,264 A | 9/1995 | Pinedo et al. | 345/508 |
| 5,452,456 A | 9/1995 | Mourey et al. | 713/100 |
| 5,502,809 A | 3/1996 | Takano | 345/509 |
| 5,581,766 A * | 12/1996 | Spurlock | 713/2 |
| 5,617,552 A | 4/1997 | Garber et al. | 395/401 |
| 5,640,562 A | 6/1997 | Wold et al. | 395/652 |
| 5,666,521 A | 9/1997 | Marisetty | 345/525 |
| 5,675,382 A | 10/1997 | Bauchspies | 348/390 |
| 5,699,539 A | 12/1997 | Garber et al. | 395/402 |
| 5,742,797 A | 4/1998 | Celi, Jr. et al. | 345/507 |
| 5,752,275 A | 5/1998 | Hammond | 711/207 |
| 5,757,386 A | 5/1998 | Celi, Jr. et al. | 345/507 |
| 5,768,593 A | 6/1998 | Walters et al. | 395/705 |

(Continued)

FOREIGN PATENT DOCUMENTS

EP 0 524 773 A1 7/1992

(Continued)

OTHER PUBLICATIONS

Andrew J. Chalk, "Ega and Vga Smooth Scrolling and Panning" Doctor Dobbs Journal, Dec. 1988, pp. 1-25.*

(Continued)

Primary Examiner—W. Thomson
Assistant Examiner—Dwin M. Craig
(74) Attorney, Agent, or Firm—Woodcock Washburn LLP

(57) ABSTRACT

A method for emulating the functionality of VGA hardware, wherein the emulator program of the present invention maintains a set of tables that permits the emulator program to branch to a function customized for both the instruction and the operating mode of the VGA hardware. When the customized function has already been generated, the emulator will automatically dispatch directly into the customized function. If an instruction is executed at a time when the VGA operating mode has changed, the addresses of the customized functions are loaded from a second table. If a customized function is not present, a customized function is generated and the tables are updated to point to the addresses of the newly created customized function. As the VGA hardware is switching among operating modes, a customized function is not generated until such time when an actual instruction is executed for the VGA hardware.

18 Claims, 5 Drawing Sheets

U.S. PATENT DOCUMENTS

| | | | | |
|---|---|---|---|---|
| 5,790,825 A * | 8/1998 | Traut | ............ | 712/209 |
| 5,801,717 A * | 9/1998 | Engstrom et al. | ............ | 345/539 |
| 5,815,686 A | 9/1998 | Earl et al. | ............ | 395/500 |
| 5,831,607 A | 11/1998 | Brooks | ............ | 345/333 |
| 5,860,147 A | 1/1999 | Gochman et al. | ............ | 711/207 |
| 5,940,872 A | 8/1999 | Hammond et al. | ............ | 711/207 |
| 5,964,843 A * | 10/1999 | Eisler et al. | ............ | 719/323 |
| 6,008,847 A | 12/1999 | Bachspies | ............ | 348/391 |
| 6,014,170 A | 1/2000 | Pont et al. | ............ | 348/232 |
| 6,026,476 A | 2/2000 | Rosen | ............ | 711/206 |
| 6,044,408 A * | 3/2000 | Engstrom et al. | ............ | 719/328 |
| 6,067,618 A | 5/2000 | Weber | ............ | 713/1 |
| 6,115,054 A * | 9/2000 | Giles | ............ | 345/522 |
| 6,332,184 B1 * | 12/2001 | Campbell | ............ | 711/207 |
| 6,452,599 B1 * | 9/2002 | Campbell | ............ | 345/522 |
| 6,542,938 B1 * | 4/2003 | Kamen et al. | ............ | 719/328 |
| 6,633,905 B1 * | 10/2003 | Anderson et al. | ............ | 709/219 |
| 6,884,171 B1 * | 4/2005 | Eck et al. | ............ | 463/42 |

FOREIGN PATENT DOCUMENTS

| | | |
|---|---|---|
| EP | 0 645 701 A2 | 9/1994 |
| WO | WO 98/57262 | 12/1998 |

OTHER PUBLICATIONS

Abrash M. "Demystifying 16-bit VGA" Doctor Dobbs Journal, May 1990, pp. 70-81.*

PCT International Search Report in International Application No. PCT/US 01/22276, International filing date Jul. 16, 2001, mail date Mar. 7, 2002.

Traut E, "Building the Virtual PC," *Byte*, McGraw-Hill Inc., vol. 22, No. 11, pp. 51-52, Nov. 1, 1997.

"Intel386 DX Microprocessor," *Intel*, pp. 32-58, Dec. 31, 1995.

"MacIntosh and Technology: Changing Chips in the Middle of the Stream, or Apple Takes a Risc," URL:www.btech.co/changingchips.html, paragraphs '0006!-'0007!, retrieved Oct. 12, 2001.

"M68040 User's Manual," Motorola, Inc., Chapter 3, copyright 1990, revised 1992, 1993.

Osisek DL et al., "ESA/390 Interpretive-Execution Architecture, Foundation for VM/ESA," *IBM Systems Journal*, vol. 30, No. 1, pp. 34-51, 1991.

Shang Rong Tsai et al., On the Architectural Support for Logical Machine Systems, *Microprocessing and Microprogramming*, vol. 22, No. 2, pp. 81-96, Feb. 1988.

"Processor Instruction Sets," The PC Guide, version date Dec. 18, 2000, http://www.pcguide.com/ref/cpu/arch/int/inst-c.html.

"M68060 User's Manual," Motorola, 1994, pp. i-xviii; Section 4, Memory Management Unit, pp. 4-1 to 4-30, http://e-www.motorola.com/brdata/PDFDB/MICROPROCESSORS/32_BIT/68K-COLDFIRE/M680X0/MC68060UM.pdf.

"MPC750, RISC Microprocessor User's Manual," Motorola, Aug. 1997, Contents, pp. iii-xvi; Chapter 5, Memory Management, pp. 5-1 to 5-34; Glossary, pp. Glossary-1 to Glossary-13, http://e- www.motorola.com/brdata/PDFDB/MICROPROCESSORS/32_BIT/POWERPC/MPC7XX/MPC750UM.pdf.

PCT International Search Report In International Application No. PCT?US 01/22277, International filing date Jul. 16, 2001, mail date Feb. 7, 2002.

\* cited by examiner

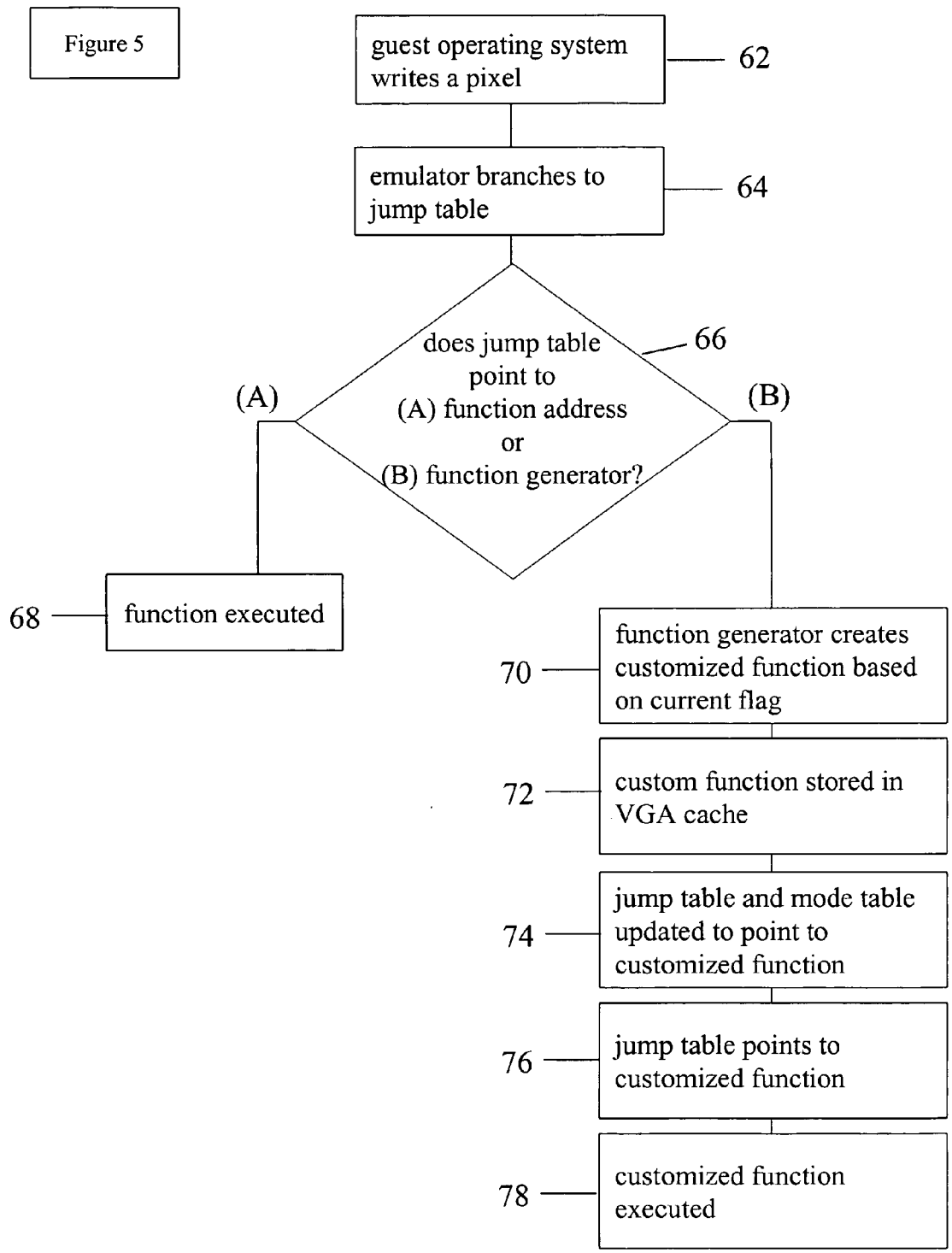

SYSTEM AND METHOD FOR EMULATING THE OPERATION OF A VIDEO GRAPHICS ADAPTER

TECHNICAL FIELD OF THE INVENTION

The present invention relates in general to the field of computer system emulation and, more particularly, to a method for emulating the operation of a video graphics adapter.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the host computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

The video graphics adapter (VGA) architecture of the 80X86 computer system architecture family has evolved over the history of the PC. The VGA system provides four-bit color up to 640×480 pixel resolution or 8-bit color up to 320×200 pixel resolution. The VGA architecture is an extension of earlier standards, such as monochrome display adapter (MDA) for simple black-and-white text, color graphics adapter (CGA) for simple 2-bit color and colored text modes, and enhanced graphics adapter (EGA) for four-bit color up to 320×200 resolution. The VGA architecture, which was complex at the time of its introduction, has only grown more complex with the more recent extensions to the standard. Much of the complexity of the VGA architecture stems from the implementation of backwards compatibility with the earlier standards. The layered extensions to the original VGA standard have resulted in the very complex operation of VGA graphics in modern PC systems. As a result, even the simplest of instructions to the VGA hardware can result in a complex set of operations in the VGA hardware. The complexity of the VGA hardware architecture is also affected by the number of VGA modes and the ability to modify the operation of the VGA hardware by changing register settings in the VGA hardware. The VGA modes include a number of read modes, write modes, ALU operation modes, and adjustable plane and pixel masks. Each of these operational modes may affect a single load or store to or from video RAM.

Attempting to account for the complexity of the VGA hardware architecture, including all of the permutations that can be introduced by the VGA operating modes and hardware register settings, makes instruction translation from the PC environment to another computer environment, such as the PowerPC environment, a difficult and time-consuming task. As an example, checking all of the VGA settings slows the emulator program. Thus, translating each instruction on the basis of the full potential of the VGA architecture results in slow emulation.

VGA hardware emulation must also differentiate regular instructions from those instructions directed to VGA hardware. The only difference between guest instructions directed to VGA hardware and regular load and store instruction is that the former instructions are mapped to memory associated with the VGA hardware while the latter instructions are mapped to main memory. Generally, an emulator translates guest instructions into a load or store instruction in the host environment. Because these instructions are regular host load and store instructions, the emulator requires a mechanism to detect when the instructions are directed to the emulated VGA hardware. Therefore, the emulator ensures that the guest virtual memory pages associated with VGA hardware instructions are not mapped to the host physical memory. As a result, those instructions directed to VGA hardware will normally cause a page fault error. Because the page fault handler can detect that VGA memory is involved, a function may be called to perform the task associated with the instruction.

However, incurring a page fault on every pixel write operation consumes a considerable amount of system resources because a typical VGA display resolution will have several thousand pixels. For example, a display resolution of 320×200 consists of 64,000 pixels. Therefore, it is desirable to minimize the occurrence of page faults. In order to minimize the number of page faults, it is preferable to patch the cached translated code associated with the guest instruction so that the page fault only occurs once. Essentially, when a page fault is detected, the store or load instruction that caused the page fault is replaced with a branch instruction to a function which handles all of the VGA modes but is executed under the emulator. Note that the emulator is not required to backpatch the translated code to properly emulate VGA operation. The emulator could handle all instructions directed to the VGA hardware entirely through the page fault mechanism, but thus would incur a serious performance penalty.

However, different VGA modes require a different number of instructions to perform a given action. Because there are several disadvantages associated with generating code inline, an emulator may replace the guest load or store instruction with a branch to a general purpose VGA function. This general purpose function is capable of handling all the various graphical operations. However, every time a pixel was written, this general purpose function had to test many or all of the various attributes to determine which code to execute. Commonly, the general purpose function performed all of the various graphical operations to the pixel, even if some of those stages or operations would have no effect on the final result. For example, a pixel masking operation that returned the entire pixel would be performed, even though this operation could be ignored. As a result, the performance of the emulator is adversely affected by having to perform these unnecessary operations.

SUMMARY OF THE INVENTION

In accordance with the present invention, a method is provided for emulating the operation of VGA hardware in an emulated operating environment in a computer system that substantially eliminates or reduces the disadvantages associated with previous emulators.

Rather than attempting to emulate the full functionality of the VGA hardware for each VGA hardware instruction received by the emulator program, the emulator program of the present invention instead maintains a table that permits the emulator program to branch to a function customized for both the instruction and the operating mode of the VGA hardware. If an instruction is executed at a time when the VGA operating mode has changed, the addresses of the customized function are loaded from a second table. If a customized function is not present, a customized function is generated and the tables are updated to point to the addresses of the newly created customized routine. As the VGA hardware is switching among operating modes, a customized function is not generated until such time when an actual instruction is executed for the VGA hardware.

One advantage of the present invention is that the branching process is streamlined in that when the function has already been generated, the emulator will automatically dispatch directly into the customized function without needing to first test for whether the function already exists. Another advantage of the present invention is that because a function is not generated until it is needed, the emulating process avoids any unnecessary operations.

Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 5 is another process diagram for the emulation of VGA hardware.

DETAILED DESCRIPTION OF THE INVENTION

The present invention provides an emulation technique for the VGA hardware architecture that involves the creation of custom code for the VGA operational settings encountered by the emulator. The invention involves the use of a table that directs the emulated program to a customized function which handles the specific VGA settings that are present when the emulated instruction is executed. As the mode of the VGA hardware changes, this table of address pointers is updated to reflect the addresses of a new set of routines customized to the new mode of the VGA hardware. In some instances, a customized function will not yet have been prepared by the emulator for the operating mode of the VGA hardware. In this instance, a special address that will cause a function generator to be executed will instead be installed in the table.

Figure 1:
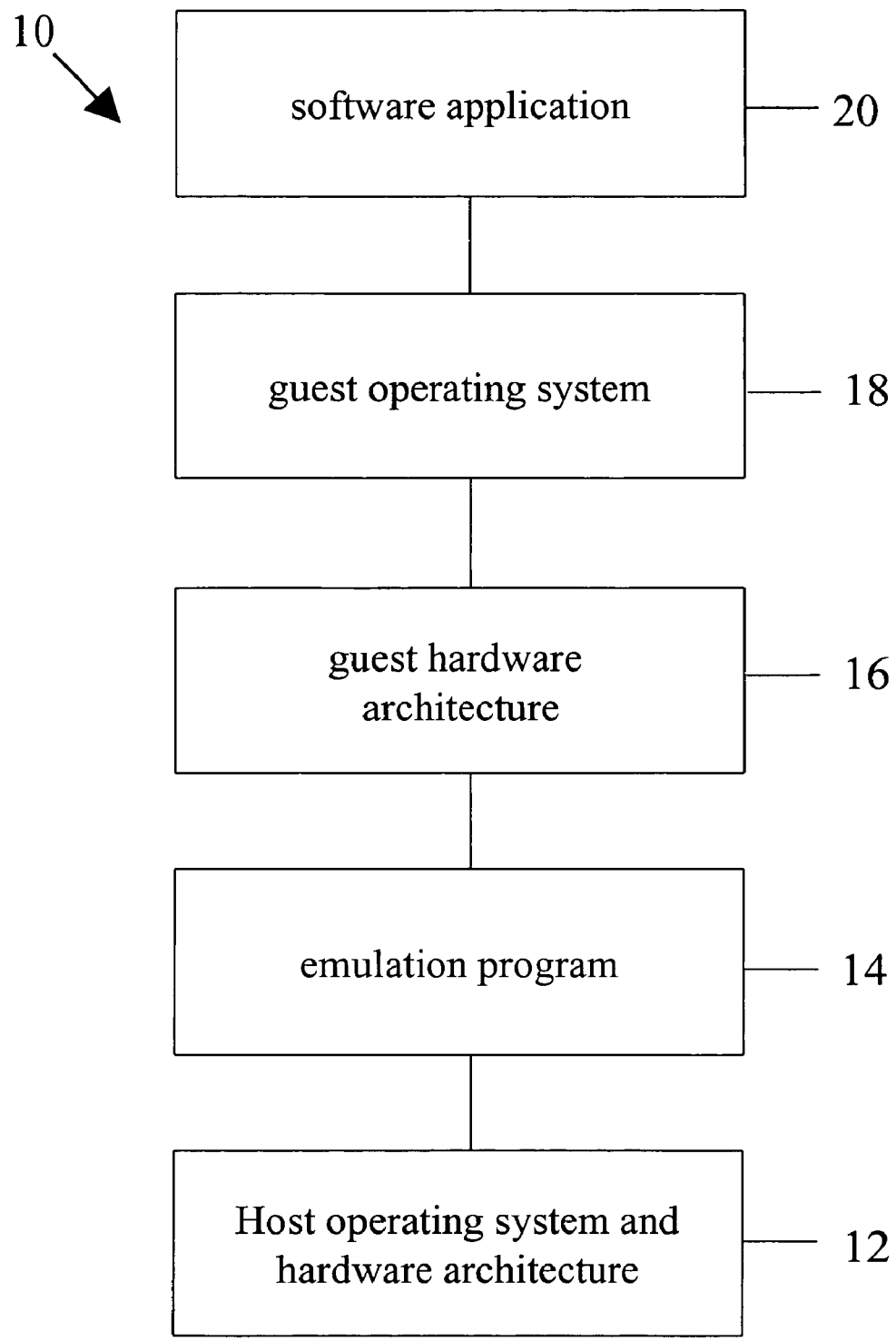
FIG. 1 is a diagram depicting an emulating operating environment in a computer system.

Shown in FIG. 1 is a diagram of the logical layers of the hardware and software architecture for an emulated operating environment in a computer system 10. An emulation program 14 runs on a host operating system and/or hardware architecture 12. Emulation program 14 emulates a guest hardware architecture 16 and a guest operating system 18. Software application 20 in turn runs on guest operating system 18. In the emulated operating environment of FIG. 1, because of the operation of emulation program 14, software application 20 can run on the computer system 10 even though software application 20 is designed to run on an operating system that is generally incompatible with the host operating system and hardware architecture 12.

During the operation of software application 20, the guest operating system 18 issues instructions directed to the emulated or guest VGA hardware, part of guest hardware architecture 16. These instructions may be load or store commands. A load command requests that information be read from memory, and a store command requests that information be written to memory. The VGA instructions are actually regular load or store instructions in the guest instruction set. But because the VGA instructions occupy a different block of addresses than other instructions, VGA instructions are generally mapped to the memory devices associated with the VGA hardware rather than the main memory. Although the VGA instructions do not in themselves change, the way in which these instructions are interpreted does change, according to the particular VGA global mode. Thus, emulator 14 must take into account the particular global VGA mode in order to properly translate a specific guest instruction. The mode refers to the particular configuration of registers for the emulated VGA hardware. There are numerous global VGA modes because the global VGA mode is determined by the combination of the particular VGA submode and other operational settings. As discussed above, examples of submodes include graphics mode, text mode, and arithmetic logic unit (ALU) mode, among other examples. Examples of other operational settings that determine the global VGA mode include pixel masking and planar setting, among other examples.

Figure 2:
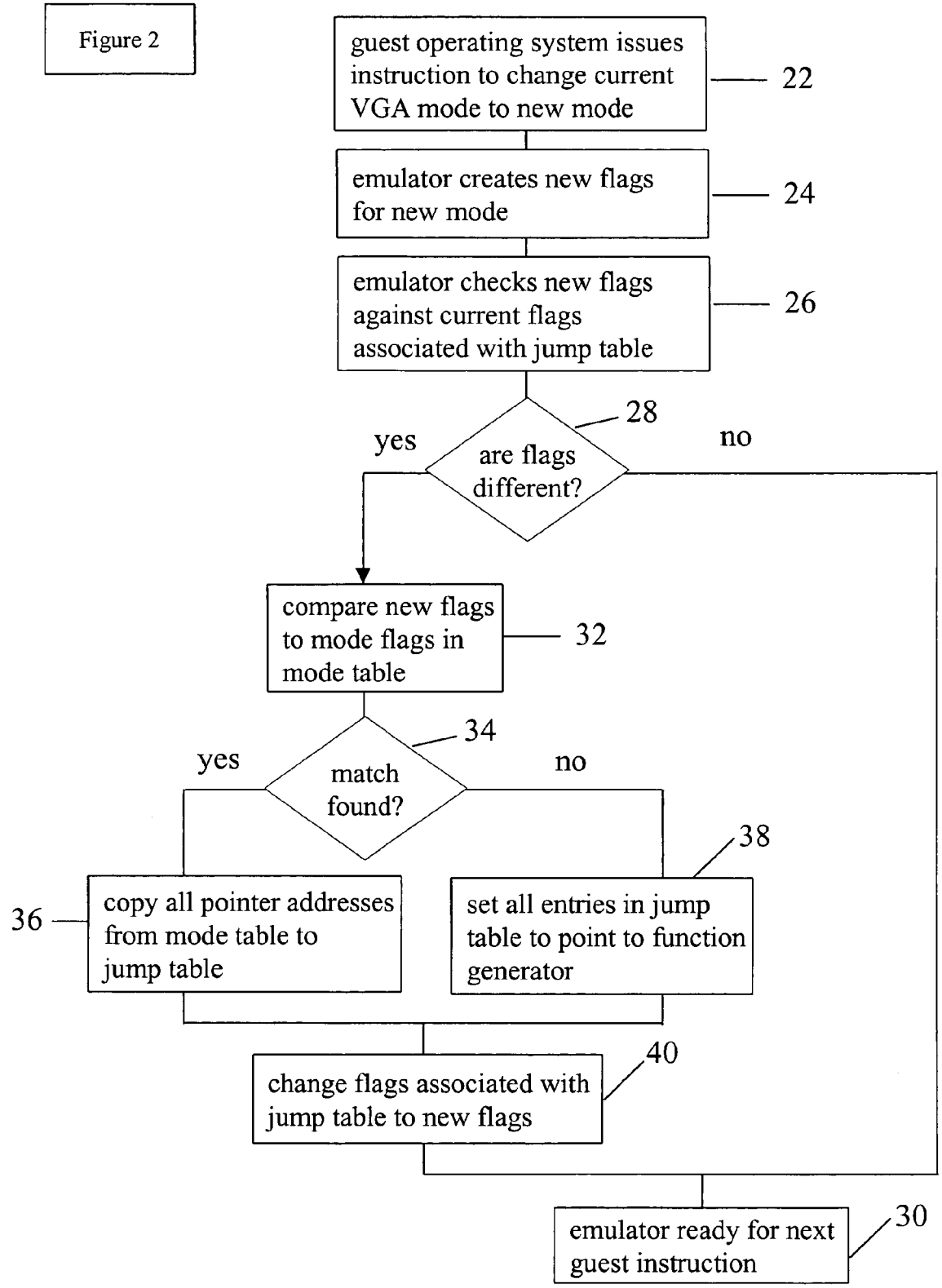
FIG. 2 is a process diagram for the emulation of VGA hardware.
Figure 3:
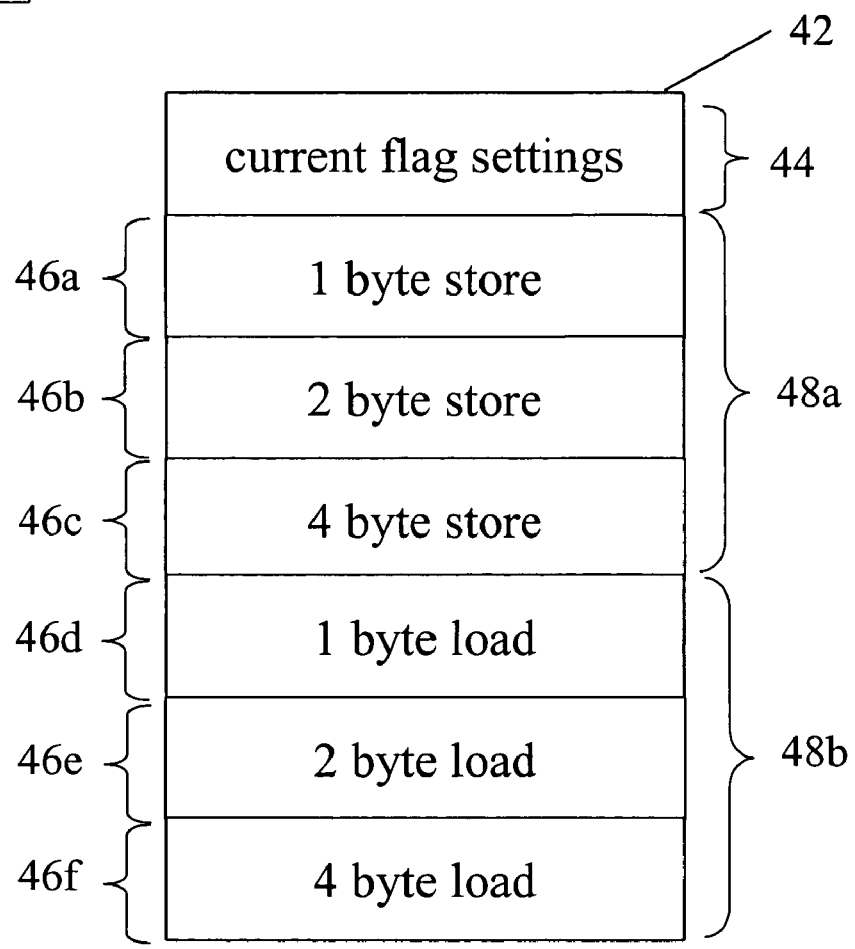
FIG. 3 is an embodiment of a jump table of the present invention.

Shown in FIG. 2 is a process diagram of the emulation of the VGA hardware of guest operating system 18. At step 22, guest operating system 18 issues an instruction that is directed to the guest VGA hardware to change the VGA mode from the current mode to a new mode. As discussed above, the emulator 14 cannot properly translate guest operating instructions directed to the emulated VGA hardware unless the emulator 14 takes into account the current VGA mode. At step 24, emulator 14 creates flags, or mode identifiers, for the new mode. These flags are software marks that correspond to the particular configuration of registers for a given VGA mode. Therefore, because different VGA modes will generally have different register configurations and settings, the flags associated with these modes will also be different. For example, the flag associated with VGA mode 0 will be different from the flag associated with VGA mode 1. As a result, the emulator can determine whether two modes are equivalent by comparing the flags associated with the two modes. Thus, at step 26 the emulator checks the new flags against the flag settings for the current VGA mode. These current flag settings 44 are contained in jump table 42, shown at FIG. 3.

As discussed above, emulating VGA hardware is difficult due to the complexity of VGA architecture and the large number of modes and configurations. Because several operations will be generally be performed in a single graphics mode before changing to another mode, it is desirable to generate a set of instructions for a custom VGA mode only once and avoid regenerating this code multiple times or performing unnecessary tests through a general purpose VGA function. Therefore, it is preferable to store the function, or set of translated code, corresponding to the guest instruction so that the stored function may be used instead of generating the function again in response to a repeated instruction. For example, if the guest instruction is repeated several thousand times in a row, it is desirable to generate a customized function once, on the first load or store instruction executed, rather than calling through a general purpose function or regenerating code for each instruction executed. The function is preferably stored in a VGA cache in the main memory. The VGA cache is typically not a hardware cache, but rather a location in the main memory.

Jump table 42 is stored in memory and allows emulator 14 to utilize specialized functions instead of general purpose functions. Therefore, each jump table 42 is specific to a particular VGA mode. For example, the jump table 42 for VGA mode 0 will be different from the jump table 42 that is generated for VGA mode 1. Each entry 46 in jump table 42 contains a function pointer for each permissible operation that can be performed on VGA memory. Thus, jump table 42 may contain a section for function pointers for store instructions 48a and a section for function pointers for load instructions 48b. For example, entry 46a contains the memory address for the function corresponding to a 1 byte store instruction, while entry 46f contains the memory address for the function corresponding to a 4 byte load instruction. As a result, jump table 42 is operable to point to the VGA cache address of the function that corresponds to the guest instruction for the particular VGA mode for which jump table 42 was generated. Thus, if a load or store instruction is patched to point into jump table 42, then that load or store instruction will indirectly point to a function which implements the current VGA mode settings. If the VGA mode changes, the patched code need not be modified further.

After the emulator checks the new flags against the flag settings 44 associated with the current VGA mode that are contained in jump table 42, the emulator must then determine whether the two flags are different at step 28. If the flags are not different, then the new VGA mode is equivalent to the current VGA mode for which jump table 42 was generated. In other words, the change in register settings at step 22 was a minor change or operation and does not require any potentially new code. As a result, the function pointers 46 in jump table 42 may be used because the underlying functions are operable to execute the guest operating instructions for the new VGA mode. Thus, at step 30, the emulator is ready for the next guest instruction.

If the new flags do not match the current flag 44, then this dissimilarity indicates that the two VGA modes are substantially different. Because the change in register settings at step 22 was a major change involving a different VGA mode, a potentially different set of functions will be needed to handle the guest instructions under this new VGA mode. Thus, the emulator must then attempt to locate the appropriate set of functions for this new VGA mode.

Figure 4:
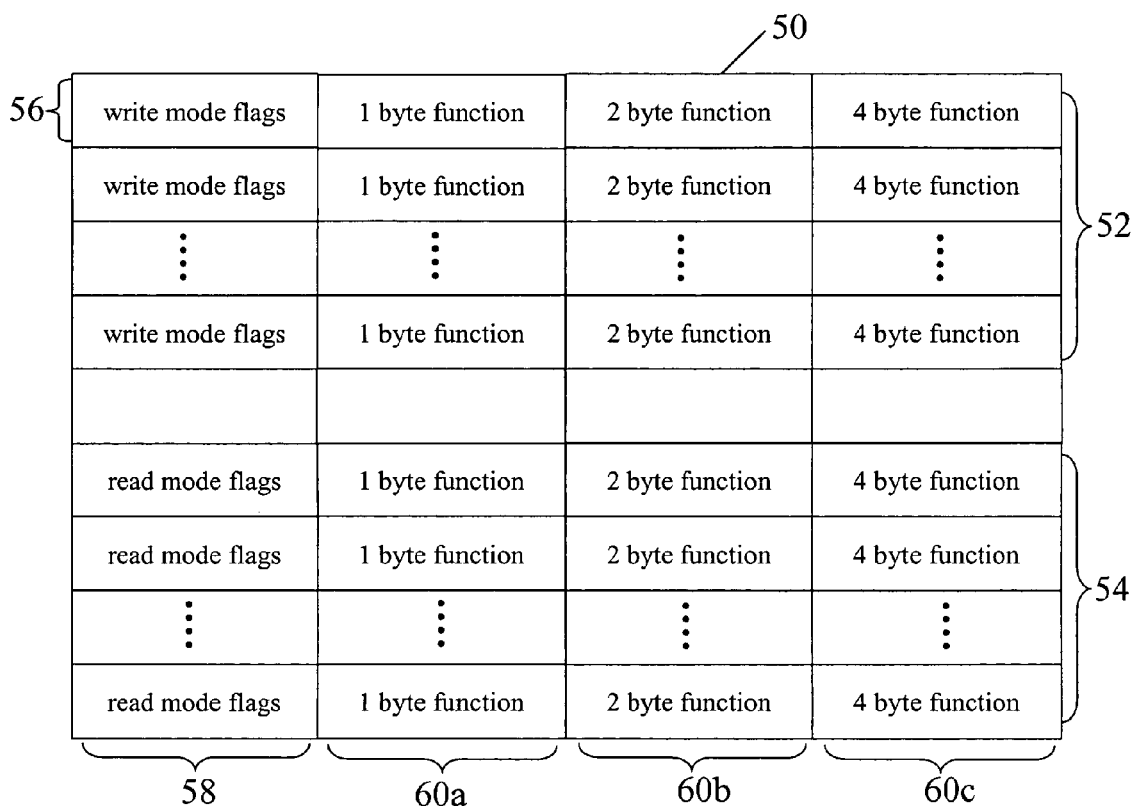
FIG. 4 is an embodiment of a mode table of the present invention.

Generally, mode table 50, shown in FIG. 4, contains address pointers for all the functions that have been generated for all of the modes which have been used before. Thus, initially, mode table 50 may not contain any function pointers. Because of the functionality difference between store and load instructions, mode table 50 may comprise a store or write section 52 and a load or read section 54. Each entry 56 in mode table 50 consists of a mode flag 58 and function pointers 60 associated with the VGA mode corresponding to mode flag 58. The three function pointers 60a, 60b and 60c point to addresses in the VGA cache that correspond to the associated functions.

At step 32, the emulator searches mode table 50 to find the mode flag entry 58 that matches the new mode flags in order to determine whether mode table 50 contains the function pointers 60 for functions which are operable to the new VGA mode. Mode table 50 is searched twice, once for load instructions and once for store instructions. At step 34, the emulator decides whether it has found a match between the flag for the new VGA mode and any of the mode flags 58. If so, then the entry 56 and corresponding function pointers 60 for the matching mode flag 58 are operable for the new VGA mode. Thus, at step 36, the emulator copies all of the function pointers 60 from matching entry 56 to jump table 42. The emulator copies the appropriate function pointers 60 from both the write section 52 and the read section 54. All six entries 46, and the underlying pointer addresses, in jump table 42 have now been changed from those associated with the current VGA mode to those associated with the new VGA mode. Thus, when the guest operating system issues an instruction under the new VGA mode, emulator 14 may use the repopulated jump table 42 to patch to the correct function.

If the emulator searches mode table 50 and does not find a mode flag entry 58 which matches the flags for the new VGA mode, then this indicates that the mode has not been used before and new functions must be generated to deal with guest operating instructions under the new VGA mode. Accordingly, at step 38, emulator 14 sets all entries 46 in jump table 42 to point to the function generator of emulator 14. The function generator is an emulator functionality that is operable to generate a set of translated code which allows the host to execute guest instructions. Regardless of whether a match was found in mode table 50, the current flag setting 44 of jump table 42 must be changed to the flags for the new VGA mode at step 40. Once jump table 42 has been updated with the appropriate pointer addresses, then emulator 14 is ready for the next guest operating instruction at step 30.

Once emulator 14 has accounted for the new VGA mode, guest operating system 18 may issue an instruction that will require a corresponding function to allow the host operating system to execute the guest instruction. For example, at step 62, shown in FIG. 5, guest operating system 18 issues a pixel write instruction. At step 64, the emulator branches to jump table 42. At this point, at step 66, jump table 42 may either point to the address in the VGA cache that contains the function which allows the host operating system to execute the guest instruction or to the function generator. If jump table 42 points to a function address, then the function is executed under host environment at step 68.

If jump table 42 points to the function generator, then the function generator creates a customized function based on the current flag setting 42 contained in jump table 42 at step 70. After the customized function has been created, it is stored in the VGA cache at step 72 and is allocated a memory address. Once the customized function has an associated address in VGA cache, jump table 42 and mode table 50 may be updated.

For the purposes of efficiency, the function generator will typically only generate that function necessary to execute the guest instruction. It is unnecessary to commit resources to generate a function unless the corresponding instruction has actually been issued. For example, if the guest instruction was a 1 byte store instruction, then only that function necessary to execute this instruction will be created. Thus, only entry 46a of jump table 42 will be updated. The other entries in jump table 42 will point to the address for the function generator. Similarly, mode table 50 will only be updated to contain an address in entry 60a in store section 52. The other entries for 60b and 60c will either be left blank or point to the function generator. An entry 56 for a new mode will preferably only be added to mode table 50 when the first function for that new mode is actually generated. This avoids populating mode table 50 with mode entries 56 that will never actually have generated code associated with them. Searching these empty entries would incur a needless performance penalty in the event of a mode change. Next, at step 76, jump table 42 points to the host executable customized function that now corresponds to the guest instruction under the current mode. The function is then executed under the host environment at step 78. The emulator 14 is now ready for the next guest instruction.

In order to conserve system resources, it may be desirable to defer the process of searching mode table 50 and repopulating jump table 42, as illustrated at steps 32 through 38 of FIG. 2, in the event of a mode change. Therefore, as an alternative, emulator 14 may avoid repopulating jump table 42 from mode table 50 until the emulator has received a guest instruction. In this case, after emulator 14 has determined that the new flags do not match the current flags associated with jump table 26 at step 28, emulator 14 replaces the entries 46 of jump table 42 with pointers to a search function instead of searching mode table 50 as shown at step 32. The search function is an emulator functionality that causes the emulator to search mode table 50. Next, emulator 14 may change the flags associated with jump table 42 to the new flags as shown at step 40 of FIG. 2. When emulator 14 receives an instruction from the guest operating system at step 62 of FIG. 5 and branches to jump table 42 at step 64, jump table 42 may alternatively point to a search function. If so, the steps of comparing the flag associated with jump table 42 to mode flags 56 of mode table 50, and populating jump table 42 with either pointers from mode table 50 or a function generator pointer, as shown at steps 32 through 38 of FIG. 2, are then performed. Subsequently, the appropriate function may be executed or generated as illustrated at steps 66 through 78 of FIG. 5. Because this alternative also uses a function pointer, emulator 14 does not incur additional overhead in the jump dispatch.

Rather than attempting to emulate the full functionality of the VGA hardware for each VGA hardware instruction received by the emulator program, the emulator program of the present invention instead maintains a set of tables that permits the emulator program to branch to a routine customized for both the instruction and the operating mode of the VGA hardware. The branching process is streamlined in that when the function has already been generated, the emulator will automatically dispatch directly into the customized function without needing to first test for whether the function already exists. Thus, large pixel operations do not incur any unnecessary overhead. If an instruction is executed at a time when the VGA operating mode has changed, the addresses of the customized routines are loaded from a second table. If a customized routine is not present, a customized routine is generated and the tables are updated to point to the addresses of the newly created customized routine. As the VGA hardware is switching among operating modes, a customized routine is not generated until such time an actual instruction is executed for the VGA hardware.

Although the present invention has been described in detail, it should be understood that various changes, substitutions, and alterations can be made thereto without departing from the spirit and scope of the invention as defined by the appended claims.

What is claimed is:

1. A method for emulating VGA hardware for a guest operating environment in a host operating environment for a computer system, wherein the guest operating environment is operable to send instructions to the VGA hardware, wherein the VGA hardware is configured under a current VGA mode, and is operable to be configured in one of a possible plurality of VGA modes, wherein the current VGA mode is associated with a set of current mode flags, and wherein the computer system comprises a memory, comprising the steps of:

receiving an instruction issued from the guest operating system and directed to the VGA hardware, wherein the instruction is directed to change the current VGA mode to a new VGA mode;

generating a set of new VGA mode flags associated with the new VGA mode;

comparing the current VGA mode flags to the new VGA mode flags;

providing a jump table, wherein the jump table comprises one or more jump table entries operable for pointing to one or more addresses in memory, wherein the jump table entries are associated with a specific VGA mode, and each jump table entry is associated with a specific instruction in the set of permissible instructions for the specific VGA mode, and wherein the jump table contains the current VGA mode flags; and providing a mode table, wherein the mode table comprises one or more mode table entries, wherein each mode table entry is associated with a specific VGA mode and is operable for pointing to one or more addresses in memory.

2. The method of claim 1, wherein each mode table entry is associated with a set of mode flags associated with the specific VGA mode.

3. The method of claim 2, further comprising the steps of:
determining that there is a significant difference between the current VGA mode flags and the new VGA mode flags, after the step of comparing the current VGA mode flags to the new VGA mode flags; and
changing the jump table entries to entries that are operable to pointing to a memory address corresponding to a search function, wherein the search function is operable to compare the mode flags associated with each mode table entry to the new VGA mode flags.

4. The method of claim 2, further comprising the steps of:
determining that there is a significant difference between the current VGA mode flags and the new VGA mode flags, after the step of comparing the current VGA mode flags to the new VGA mode flags; and
comparing the new VGA mode flags to the mode flags associated with each mode table entry.

5. The method of claim 4, further comprising the steps of:
finding mode flags associated with a mode table entry that match the new VGA mode flags after the step of comparing the new VGA mode flags to the mode flags associated with each mode table entry; and
copying the matching mode table entry to the jump table entries such that the jump table entries are operable to point to the same addresses in memory as the mode table entry.

6. The method of claim 5, further comprising the step of changing the current VGA mode flags contained in the jump table to the new VGA mode flags.

7. The method of claim 4, further comprising the steps of:
determining that none of the mode flags associated with the mode table entries match the new VGA mode flags;
setting of the jump table entries such that the jump table entries are each operable to point to the address corresponding to a function generator, wherein the function generator is operable to create a function, wherein the function is operable to allow the host operating system to execute the instruction.

8. The method of claim 7, further comprising the step of changing the current VGA mode flags contained in the jump table to the new VGA mode flags.

9. A method for emulating VGA hardware for a guest operating environment in a host operating environment for a computer system, wherein the guest operating environment is operable to send instructions to the VGA hardware, wherein the VGA hardware is configured under a current VGA mode, and is operable to be configured in one of a possible plurality of VGA modes, wherein the current VGA mode is associated with a set of current mode flags, and wherein the computer system comprises a memory, comprising the steps of:

receiving an instruction issued from the guest operating system and directed to the VGA hardware, wherein the instruction is directed to change the current VGA mode to a new VGA mode;

generating a set of new VGA mode flags associated with the new VGA mode;

comparing the current VGA mode flags to the new VGA mode flags;

providing a jump table, wherein the jump table comprises one or more jump table entries operable for pointing to one or more addresses in memory, wherein the jump table entries are associated with a specific VGA mode, and each jump table entry is associated with a specific instruction in the set of permissible instructions for the specific VGA mode, and wherein the jump table contains the current VGA mode flags;

determining that there is no significant difference between the current VGA mode flags and the new VGA mode flags, after the step of comparing the current VGA mode flags to the new VGA mode flags; and maintaining the jump table entries.

10. A computer-readable medium comprising computer-readable instructions for implementing the method of claim 9.

11. A computer-readable medium comprising computer-readable instructions for emulating VGA hardware for a guest operating environment in a host operating environment for a computer system, wherein the guest operating environment is operable to send instructions to the VGA hardware, wherein the VGA hardware is configured under a current VGA mode, and is operable to be configured in one of a possible plurality of VGA modes, wherein the current VGA mode is associated with a set of current mode flags, and wherein the computer system comprises a memory, said computer-readable instructions comprising instructions for:

receiving an instruction issued from the guest operating system and directed to the VGA hardware, wherein the instruction is directed to change the current VGA mode to a new VGA mode;

generating a set of new VGA mode flags associated with the new VGA mode;

comparing the current VGA mode flags to the new VGA mode flags;

providing a jump table, wherein the jump table comprises one or more jump table entries operable for pointing to one or more addresses in memory, wherein the jump table entries are associated with a specific VGA mode, and each jump table entry is associated with a specific instruction in the set of permissible instructions for the specific VGA mode, and wherein the jump table contains the current VGA mode flags; and providing a mode table, wherein the mode table comprises one or more mode table entries, wherein each mode table entry is associated with a specific VGA mode and is operable for pointing to one or more addresses in memory.

12. The computer-readable medium of claim 11 further comprising instructions whereby each mode table entry is associated with a set of mode flags associated with the specific VGA mode.

13. The computer-readable medium of claim 12, further comprising instructions for:

determining that there is a significant difference between the current VGA mode flags and the new VGA mode flags, after the step of comparing the current VGA mode flags to the new VGA mode flags; and changing the jump table entries to entries that are operable to pointing to a memory address corresponding to a search function, wherein the search function is operable to compare the mode flags associated with each mode table entry to the new VGA mode flags.

14. The computer-readable medium of claim 12, further comprising instructions for:

determining that there is a significant difference between the current VGA mode flags and the new VGA mode flags, after the step of comparing the current VGA mode flags to the new VGA mode flags; and comparing the new VGA mode flags to the mode flags associated with each mode table entry.

15. The computer-readable medium of claim 14, further comprising instructions for:

finding mode flags associated with a mode table entry that match the new VGA mode flags after the step of comparing the new VGA mode flags to the mode flags associated with each mode table entry; and copying the matching mode table entry to the jump table entries such that the jump table entries are operable to point to the same addresses in memory as the mode table entry.

16. The computer-readable medium of claim 14, further comprising instructions for:

determining that none of the mode flags associated with the mode table entries match the new VGA mode flags;

setting of the jump table entries such that the jump table entries are each operable to point to the address corresponding to a function generator, wherein the function generator is operable to create a function, wherein the function is operable to allow the host operating system to execute the instruction.

17. The computer-readable medium of claim 15, further comprising instructions for changing the current VGA mode flags contained in the jump table to the new VGA mode flags.

18. The computer-readable medium of claim 16, further comprising instructions for changing the current VGA mode flags contained in the jump table to the new VGA mode flags.

* * * * *